Figure 3:
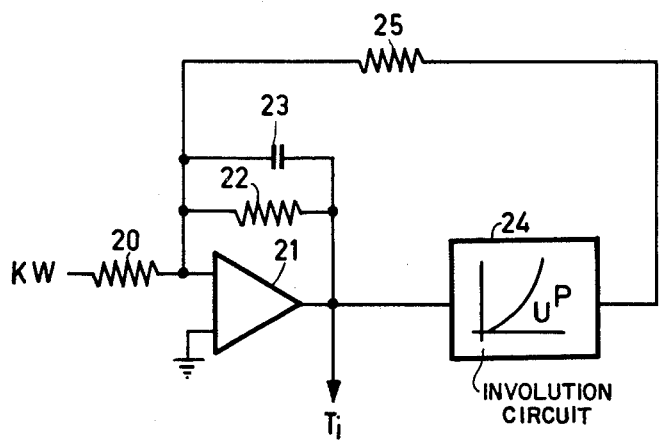

United States Patent [19]

Stege et al.

[11] 4,032,788

[45] June 28, 1977

[54] CIRCUIT ARRANGEMENT FOR SUPERVISING THE LOADING OF AN X-RAY TUBE

[75] Inventors: Peter Stege, Hamburg; Bernd Hermeyer, Henstedt-Ulzburg, both of Germany

[73] Assignee: U.S. Philips Corporation, New York, N.Y.

[22] Filed: Feb. 3, 1975

[21] Appl. No.: 546,394

[52] U.S. Cl. .............................. 250/414; 250/416 R
[51] Int. Cl.² ......................................... H05G 1/30
[58] Field of Search .......... 250/402, 401, 413, 414, 250/416, 354, 355

[56] References Cited

UNITED STATES PATENTS

| | | | |
|---|---|---|---|
| 2,054,493 | 9/1936 | Bouwers et al. | 250/401 |
| 2,129,383 | 9/1938 | Ulrey | 250/401 |
| 2,608,662 | 8/1952 | Massiot | 250/416 |
| 3,538,331 | 10/1970 | Craig | 250/416 |

*Primary Examiner*—Craig E. Church
*Attorney, Agent, or Firm*—Frank R. Trifari; Bernard Franzblau

[57] ABSTRACT

The invention relates to a circuit arrangement useful in an X-ray diagnostic apparatus for supervising the loading of an X-ray tube. A first signal which is dependent on the anode temperature controls an indication and/or a blocking device. A second signal is formed which corresponds to the maximum temperature ($T_{max}$) minus a value ($\Delta T$) which is dependent on the exposure load to be expected. The two signals are compared with each other and the indication or blocking device is released if the temperature ($T_i$) represented by the first signal is lower than the temperature ($T_{max} - \Delta T$) represented by the second signal.

14 Claims, 3 Drawing Figures

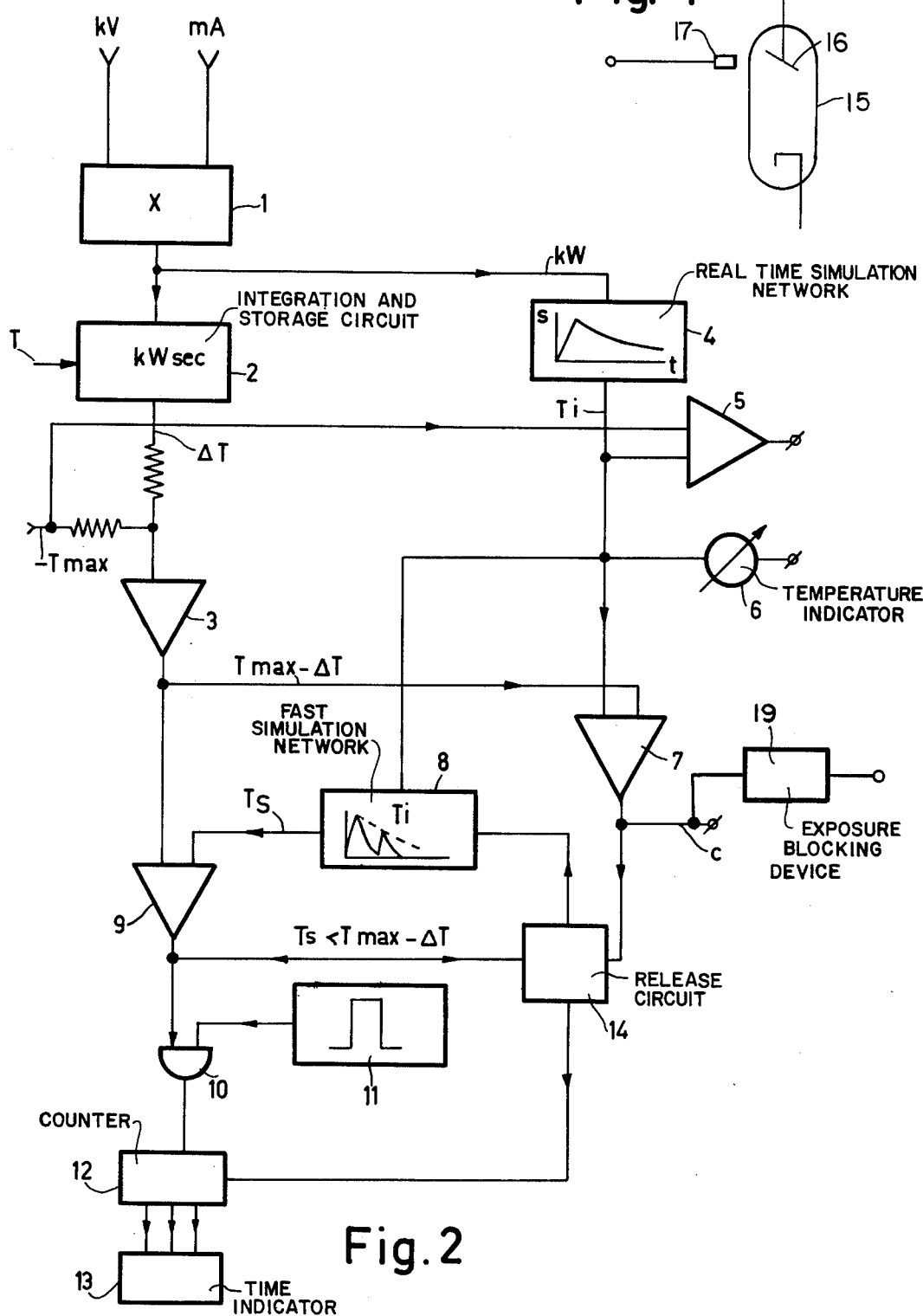

CIRCUIT ARRANGEMENT FOR SUPERVISING THE LOADING OF AN X-RAY TUBE

The invention relates to a circuit arrangement for an X-ray diagnostic apparatus for supervising the loading of an X-ray tube, a first signal being formed which is dependent on the anode temperature and which controls an indication and/or a blocking device.

A circuit arrangement of this kind is known (British Pat. No. 1,299,676). This circuit comprises a radiation measuring detector which generates a signal which is dependent on the anode temperature and which is applied to an indication device which is calibrated in thermal units. On this indication device the operator can read the quantity of heat which is instantaneously stored in the anode or which may be applied to the anode during the next exposure. If the load anticipated for the next exposure exceeds the admissible quantity of heat indicated by the indication device, the operator must wait until the admissible quantity of heat indicated by the indication device at least equals the quantity of heat to be applied during the next exposure. However, the operator does not know the length of this waiting period. Moreover, it is rather cumbersome for the operator to calculate the quantity of heat to be applied, notably in the case of apparatus incorporating so-called initial load control. In apparatus comprising an automatic exposure device, it is impossible to calculate in advance the loading of the X-ray tube during the next exposure, the indication of the admissible quantity of heat, therefore is of no use to the operator in such cases.

It is also known (German Offenlegungsschrift No. 2,130,374) to make an X-ray diagnostic apparatus a series of X-ray exposures (cine exposures), to calculate and indicate each time the feasible exposure load, i.e. the overall exposure time or the number of feasible single exposures, by means of suitable calculating devices while taking into account the previous exposure loads. If the number of single exposures still admissible is smaller than the number of single exposures desired by the operator, the operator must wait (often several minutes) until the tube has cooled down so far that the number of admissible exposures equals the desired number of exposures. However, the operator does not know the length of this waiting period.

It is furthermore known (German Offenlegungsschrift No. 1,764,983) to control the current of an X-ray tube such that the limit temperature is not exceeded during the exposure. In the case of exposures where this limit temperature would be exceeded in normal operation, the current is then reduced so that the duration of these exposures is longer than that of an exposure at the same power where the limit temperature is not exceeded, and hence the tube current is not reduced. It is not possible to use such a diagnostic apparatus for exposures for which a given exposure time (tomography exposures) or a limit time (ciné exposures) is prescribed, because the reduction of the current during the exposure time could give rise to underexposure.

Finally, protection circuits for X-ray tubes are known in which the temperature of the anode is continuously calculated and the exposure is interrupted when a limit temperature is reached, or the load is indicated U.S. Pat. No. 3,634,871 and U.S. Pat. No. 3,746,862). The switching off of the X-ray source during the exposure causes under-exposure.

British patent specification No. 767,477 describes an X-ray apparatus in which the power adjusted for the next exposure is calculated, the calculated value being compared with a value which is each time admissible for the adjusted exposure duration. This admissible value is determined by means of a simulation network which simulates the variation in time of the quantity of heat stored in the X-ray tube. If the stored quantity of heat is still too large for the load of the next exposure, exposure is prevented. The operator of this apparatus does not know how long he has to wait until he can perform the exposure with the adjusted data.

An object of the present invention is to construct a circuit arrangement of the kind set forth such that in the case of X-ray exposures made in rapid succession underexposure and overloading of the X-ray tube can be avoided (practically all modern X-ray diagnostic apparatus comprise protection circuits which prevent the tube from being overloaded by a single exposure) in that it is indicated to the operator how long he has to wait until the next exposure can be made. This object is realized by the steps taken according to the invention.

The invention is based on the following consideration: the heat energy applied to the anode during an exposure causes an increase of the anode temperature ($\Delta T$) which is proportional to the applied energy (assuming that the heat output of the anode during the exposure is small with respect to the heat input). Thus, the exposure cannot be made as long as the sum of the temperature increase to be expected and the instantaneous temperature (Ti) of the anode exceeds the maximum temperature (Tmax), or as long as the maximum temperature minus the temperature increase ($\Delta T$) is lower than the instantaneous anode temperature. The fast simulation network simulates the cooling process in an accelerated manner, and the period of time within which the simulated temperature becomes lower than the difference between $T_{max}$ and $\Delta T$ is proportional to the time which must each time be waited before the next exposure can be started with the adjusted exposure data.

For x-ray apparatus where the tube voltage and the mA-sec. are adjustable, the exposure load for the next exposure can be very simply calculated as the product of the adjusted tube voltage on the one hand and the adjusted mAs product on the other hand. For this purpose merely a multiplier circuit is required. The same is applicable to cine exposures. For a constant exposure load per individual image, the overall exposure load to be expected is proportional to the number of individual images to be made during the next exposure series or to the overall exposure time.

For X-ray diagnostic apparatus wherein only the tube voltage can be selected and the mA-sec. are dependent on the radiated object, the exposure load to be expected is not yet fixed before the exposure. In this case the exposure load of the previous exposure is determined in that the product of the adjusted voltage and the measured tube current is formed and integrated over the exposure time and applied to a store. The temperature rise derived therefrom corresponds to the actual circumstances only if the subsequent exposure load exactly equals the previous exposure load. Overloading of the X-ray tube occurs first of all when a series of exposures of the same patient is made in rapid succession. The exposure load, i.e. the heat quanity applied to the X-ray tube during exposure, is then substantially equal for the individual exposures so that in these cases it is permissible to derive the exposure load to be expected from the previous exposure load. These conditions are no longer satisfied when the next patient is due, but it was found that such a change of patient always requires so much time that the X-ray tube can cool down so far that overloading is substantially no longer possible.

Figure 1:
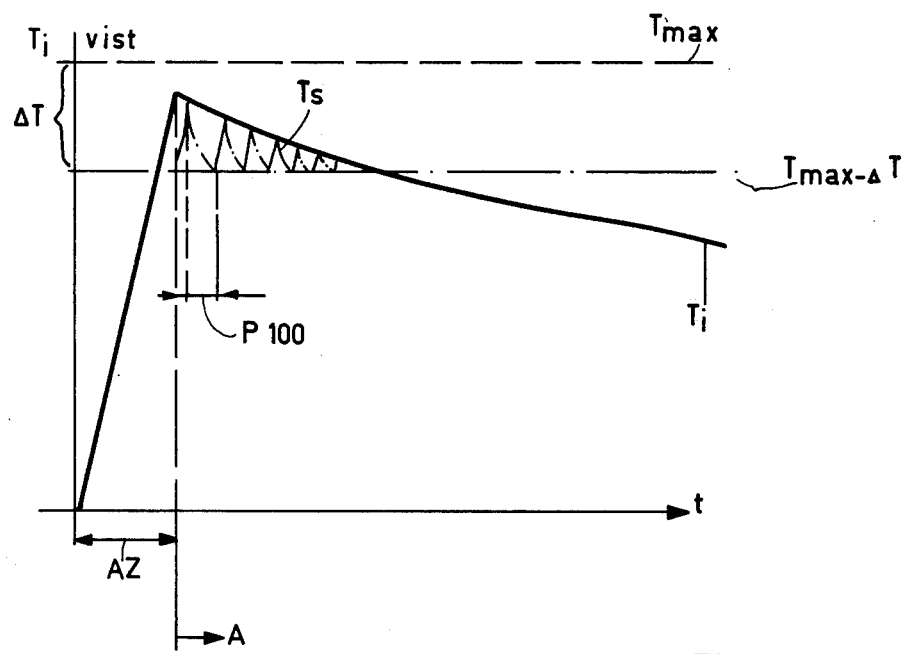

The invention will be described in detail hereinafter with reference to an embodiment as illustrated in the drawing in which:

FIG. 1 shows the variation in time of the temperature of the anode of an X-ray tube following an exposure, FIG. 2 shows a block diagram of the circuit arrangement according to the invention, and FIG. 3 shows a block diagram of a simulation circuit which forms part of the circuit shown in FIG. 2, FIG. 4 shows a diagram of an anode temperature measuring circuit which may be used instead of the real time simulation network, in FIG. 2.

FIG. 1 shows the variation in time of the temperature $T_i$ of the disc of a rotary anode X-ray tube. It appears that the temperature increases substantially linearly during the exposure, and continuously decreases again after the end of the exposure. The maximum disc temperature $T_{max}$ is denoted by a broken line in the time diagram. Beyond the temperature $T_{max}$ the temperature in the focal path is liable to become so high that melting or evaporation take place. The diagram also shows the line $T_{max} - \Delta T$ (stroke-dot line). $\Delta T$ is the temperature increase caused by the exposure load to be expected. This increase is proportional to the quantity of heat supplied during this exposure. Therefore, the larger the anticipated exposure load is, the lower the line $T_{max} - \Delta T$ will be. As long as the temperature $T_i$ of the anode disc is above the line $T_{max} - \Delta T$, the next exposure may not be started because the rotary anode disc would then assume a temperature $T_i + \Delta T$ which is higher than $T_{max}$.

The circuit arrangement which is shown in the form of a block diagram in FIG. 2 prevents the next exposure from being started before $T_i$ has reached the value $T_{max} - \Delta T$, i.e. it signals the operator that the next exposure should not yet be started. It is also indicated how long the operator must wait before the next exposure may be started.

The circuit arrangement shown in FIG. 2 is intended for use in an X-ray diagnostic apparatus comprising an x-ray tube 15 having an anode disc 16 and an automatic exposure device, not shown where the operator merely has to adjust the exposure voltage and where the exposure is terminated when a given radiation dose has been reached. The adjusted high voltage kv and the measured tube current (measured, for example, across a resistor, not shown, in the high-voltage circuit of the X-ray tube 15) are applied to a multiplier circuit 1, the output signal of which is thus proportional to the product of the product of the tube voltage and the tube current and hence to the power applied to the X-ray tube. During the period a signal T is applied to circuit section 2, as is the product of tube voltage and current derived in the multiplier 1. This product is integrated and stored in the circuit section 2, with the result that the output signal of the circuit 2 is proportional to the energy applied to the tube anode during the exposure. If it is assumed that the exposure load is equally large during the next exposure, this signal is also proportional to the temperature increase $\Delta T$. In an operational amplifier 3 this signal is coupled to a signal corresponding to the maximum temperature $T_{max}$ such that on the output of the operational amplifier a signal appears which corresponds to the temperature $T_{max} - \Delta T$.

The output signal of the multiplier stage 1 is simultaneously applied to a real time simulation network 4 which simulates the variation of the anode temperature (Ti) and which generates an output signal which is proportional to the temperature ($T_i$) of the anode disc 16. This real time simulation network provides a means for forming a first signal dependent on the tube anode temperature ($T_i$) and can consist of a simple analog calculating circuit.

A circuit of this kind is shown in FIG. 3. The input signal, being proportional to the power applied to the X-ray tube, is applied, via a resistor 20, to an operational amplifier 21 having a very high input resistance. The output of this operational amplifier is connected to its input via the parallel connection of a resistor 22 and a capacitor 23. Moreover, the output of the operational amplifier controls an involution circuit 24, the output signal of which involutes the input signal with an exponent p. The output signal of the involution circuit 24 is applied to the input of the operational amplifier 21 via a resistor. 25. The circuit can satisfy the heat conduction equation:

$$dT/dt = K_1 \cdot T - K_2 \cdot T^p;$$

by suitable proportioning of the individual elements, the factors $K_1$, $K_2$ and the exponent $p$ can be made to take into account the heat conduction, storage and radiation properties of the tube anode. The output signal of the operational amplifier 21 thus varies in the same way as the temperature $T_i$ of the tube anode. Alternatively, the real time simulator 4 can be dispensed with if the anode temperature ($T_i$) is measured. The tube anode temperature can be measured by means of a light and/or a heat sensitive detector adjacent the anode 16. The emitted light and/or heat from the tube anode excites the detector which produces an output signal which provides an adequate indication of the anode temperature ($T_i$).

The output signal of the real time simulator 4 (or the detector 17) is applied to a comparator 5 and is compared with the signal representing the maximum temperature $T_{max}$. If it is found that the temperature of the rotary anode disc exceeds the maximum temperature (overloading), an alarm device (not shown) is actuated by the output signal of the comparator 5.

The output signal of the real time simulator 4 is moreover applied to a measuring/indicating circuit 6 which thus indicates the temperature condition of the x-ray tube anode disc.

In addition, the output signal of the real time simulator 4 is applied to one input of a comparator 7, the other input of which receives the output signal of the operational amplifier 3, i.e. a signal proportional to the expression $T_{max} - \Delta T$. The output signal of the comparator 7 signals whether the anode temperature $T_i$ is higher or lower than the temperature $T_{max} - \Delta T$. If it is higher, the output signal of the comparator 7 actuates an exposure blocking device 19 which in turn prevents the x-ray tube from being switched on. The operator can also be given an alarm signal. Overloading of the X-ray tube can thus be prevented as mentioned above, instead of the real time simulator 4 fed by the multiplier circuit 1, use can alternatively be made of a radiation detector (see, for example, British Pat. No. 1,299,676), the output signal of which is dependent on the anode temperature.

In X-ray apparatus having two-knob or three-knob control wherein the mAs product can be adjusted, the temperature increase $\Delta T$ can also be calculated by means of a simple calculating device which multiplies the mAs product adjusted for the next exposure by the exposure voltage, so that the integration and storage circuit 2 can be dispensed with.

Finally, the signal representing the temperature $T_i$ of the anode disc is also applied to a fast simulation network 8 which simulates the cooling process of the anode disc, for example, at a 100-fold speed. This network can have the same construction as the real time simulation network, but the elements 20, 22, 23 and 25 are proportioned such that the output signal $T_s$ which represents the simulated anode temperature, reaches its stable value 100 times faster. The signal $T_s$ is applied to a comparator 9 and is compared with a second signal $T_{max} - \Delta T$ present at the output of the operational amplifier 3. As long as the signal $T_s$ exceeds the signal $T_{max} - \Delta T$, the comparator supplies an output signal which opens the gate 10 so that pulses generated by the generator 11 can be applied to the counter 12, the number of pulses counted being indicated on an indicator 13 at the end of a counting procedure. The number of pulses indicated represents the period of time between the beginning of a fast simulation cycle ($Ts = T_i$) and the end thereof ($T_s = T_{max} - \Delta T$) and — because this period amounts to 1/100 part of the period within which the anode temperature $T_i$ reaches the temperature $T_{max} - \Delta T$ — this number is also proportional to the waiting time to be expected. By a suitable construction of the indicator 13, or by proper choice of the pulse frequency of generator 11, the waiting time to be expected can thus be directly read.

The waiting time to be expected is continuously calculated anew during the cooling process. As soon as the simulated temperature signal $T_s$ becomes smaller than the value $T_{max} - \Delta T$, a signal appears at the output of the comparator 9 which blocks the gate 10 and which actuates a release circuit 14 which, on the one hand, resets the counter 12 and which, on the other hand, briefly applies the signal $T_i$ to the fast simulator network 8 (see FIG. 1). The simulation cycle then commencing is shorter because the temperature $T_i$ has meanwhile decreased, so that the output signal $T_s$ of the fast simulation network more quickly corresponds to the value $T_{max} - \Delta T$. Consequently, after the termination of this counting cycle, the indicator 13 indicates a shorter waiting time. The simulation cycle is repeated until the anode temperature $T_i$ has become lower than the temperature $T_{max} - \Delta T$. At this instant the exposure is released at the output of the comparator 7 and at the same time the release circuit 14 is blocked so that further counting cycles are prevented. It is not absolutely necessary that the simulation cycle be continuously repeated. The fast simulation cycle could, therefore, also be started, for example, by means of a pushbutton actuated by the operator (instead of by the release circuit 14), so that the waiting time to be expected is indicated only if the operator gives a relevant command.

Instead of a digital indication by the counting and measuring device 12, 13, an analog indication can, of course, be obtained by integration of the pulses supplied by the gate 10 and by applying these pulses to an indication and storage circuit.

What is claimed is:

1. In an x-ray diagnostic apparatus, a circuit for supervising the loading of an x-ray tube comprising, means for forming a first signal which is dependent on the x-ray tube anode temperature $T_i$ and which controls an indication device,
   a. a circuit arrangement for forming a second signal which corresponds to the maximum allowed temperature ($T_{max}$) of the tube anode minus a temperature value ($\Delta T$) which is dependent on an anticipated exposure load of the x-ray tube,
   b. a fast simulation network for providing an output signal $T_s$ indicative of the accelerated simulation of the anode temperature, means for applying said first signal to the fast simulation network at the beginning of each simulation cycle,
   c. a time measuring device for measuring the time expiring between the beginning of a simulation cycle and the instant at which the output signal ($T_s$) of the fast simulation network becomes smaller than the second signal, and
   d. an indication device controlled by the time measuring device.

2. A circuit as claimed in claim 1 further comprising a comparison circuit which compares the first and the second signal and which releases an indication or blocking device when the temperature ($T_i$) represented by the first signal exceeds the temperature ($T_{max} - \Delta T$) represented by the second signal.

3. A circuit as claimed in claim 1 wherein the first signal is formed by a radiation measuring detector which is sensitive to light and/or heat radiation emitted by the tube anode.

4. A circuit as claimed in claim 1 wherein said first signal forming means comprises, a multiplier circuit, means for applying a signal which is proportional to an adjusted exposure voltage of the x-ray tube and a signal which is proportional to the tube current measured during the exposure period to said multiplier circuit, means for applying the output signal of the multiplier circuit to a real time simulation network thereby to obtain said first signal dependent on the anode temperature $T_i$.

5. A circuit as claimed in claim 1 wherein said second signal forming circuit arrangement includes means for the formation of a signal proportional to the temperature value ($\Delta T$) comprising, a multiplier stage, means for applying a signal determined by the adjusted tube exposure voltage and a signal determined by the tube current during an exposure period to the multiplier stage which forms a third signal proportional to the adjusted exposure voltage and to the tube current measured during the exposure period, said third signal being integrated and stored in an integrator stage during the exposure time to derive said temperature value signal $\Delta t$.

6. A circuit as claimed in claim 1 wherein said second signal forming circuit arrangement includes means for the formation of a signal proportional to the temperature value ($\Delta T$) comprising, a multiplier stage which multiplies a signal determined by the adjusted exposure voltage of the tube and a signal determined by the product of tube current and the tube exposure time.

7. A circuit as claimed in claim 1 further comprising, a release circuit which briefly applies the first signal to the fast simulator network and which resets the time measuring device as soon as the output signal ($T_s$) of the fast simulation network becomes smaller than the value of the second signal.

8. A circuit as claimed in claim 7 further comprising a comparison circuit which compares said first and second signals, the release circuit being rendered inactive by the comparison circuit when the temperature ($T_i$) represented by the first signal becomes lower than the temperature ($T_{max} - \Delta T$) represented by the second signal.

9. A circuit for monitoring the loading of an x-ray tube comprising, means for deriving a first signal which varies in a manner corresponding to the variation of the x-ray tube anode temperature $T_i$, circuit means for deriving a second signal $T_{max} - \Delta l$ which corresponds to the maximum safe temperature $I_{max}$ of the tube anode minus a temperature increase $\Delta T$ dependent on the anticipated heat quantity supplied during a tube exposure, a comparison circuit responsive to said first and second signals for producing a first control signal when the first signal exceeds the second signal, a fast simulation network responsive to said first signal for deriving an output signal $T_s$ which simulates the cooling characteristic of the tube anode but at an accelerated rate substantially greater than the true anode cooling rate, time measuring means controlled by said second signal and said output signal $T_s$ for measuring the time required for the output signal $T_s$ to traverse the range between the value of the first signal $T_i$ and the value of the second signal $T_{max} - \Delta T$, and an indicator controlled by said time measuring means for indicating the waiting period required before the next x-ray exposure can be made in the event said first signal exceeds said second signal.

10. A circuit as claimed in claim 9 wherein said first signal deriving means comprises, a multiplier circuit responsive to the x-ray tube voltage and tube current to produce at its output a second control signal, and a real time simulation network responsive to said second control signal to derive at its output said first signal which simulates the variation of the anode temperature $T_i$.

11. A circuit as claimed in claim 10 wherein said circuit means for deriving said second signal includes said multiplier circuit, means responsive to the second control signal and a signal determined by the exposure time of the x-ray tube for producing a signal determined by the anode temperature increase $\Delta T$, and means for combining said $\Delta T$ signal with a signal proportional to the maximum safe temperature $T_{max}$ to derive said second signal.

12. A circuit as claimed in claim 9 wherein said first signal deriving means comprises a radiation detector sensitive to light and/or heat radiation emitted by the tube anode.

13. A circuit as claimed in claim 9 wherein said circuit means for deriving said second signal comprises, a multiplier circuit responsive to the x-ray tube voltage and tube current to produce at its output a second control signal, means responsive to the second control signal and a signal determined by the exposure time of the x-ray tube for producing a signal determined by the anode temperature increase $\Delta T$, and means for combining said $\Delta T$ signal with a signal proportional to the maximum safe temperature $T_{max}$ to derive said second signal.

14. A circuit as claimed in claim 9 wherein said comparison circuit produces a second control signal when the second signal exceeds the first signal, and means responsive to said second control signal for effectively inhibiting the operation of said fast simulation network.

* * * * *

UNITED STATES PATENT AND TRADEMARK OFFICE
CERTIFICATE OF CORRECTION

PATENT NO. : 4,032,788
DATED : June 28, 1977
INVENTOR(S) : PETER STEGE ET AL

It is certified that error appears in the above-identified patent and that said Letters Patent are hereby corrected as shown below:

Col. 3, line 66, after "exposure" there should be --period--

Col. 4, line 68, "prevented as mentioned above" should be

--prevented. As mentioned above,--;

col. 5, line 19, after "$T_S$" there should be --,-- (comma).

Signed and Sealed this

Seventeenth Day of January 1978

[SEAL]

Attest:

RUTH C. MASON
Attesting Officer

LUTRELLE F. PARKER
Acting Commissioner of Patents and Trademarks